C. H. ROBINSON.
BOLL WEEVIL REMOVING ATTACHMENT FOR CULTIVATORS.
APPLICATION FILED DEC. 4, 1915.
1,184,382.
Patented May 23, 1916.
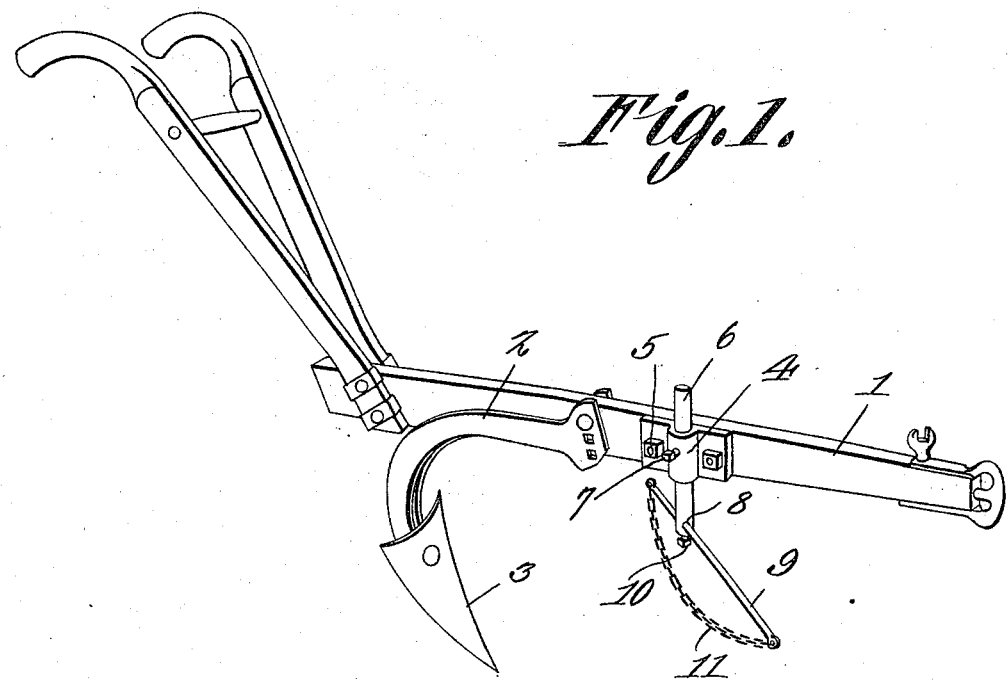
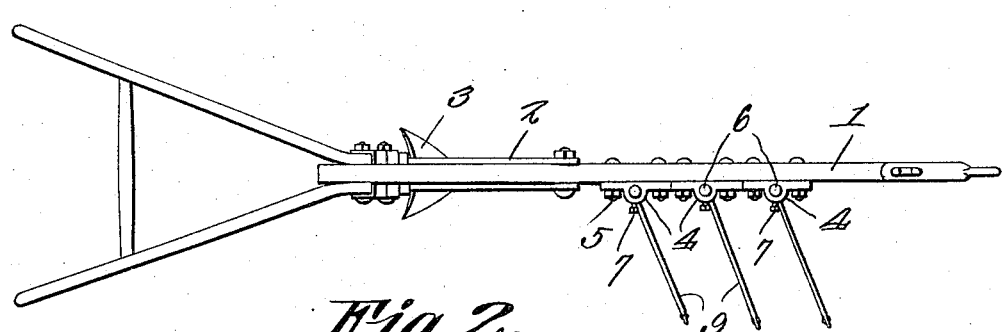
C. H. Robinson
Inventor

UNITED STATES PATENT OFFICE.

CARL H. ROBINSON, OF SNOW HILL, ALABAMA.

BOLL-WEEVIL-REMOVING ATTACHMENT FOR CULTIVATORS.

1,184,382.  Specification of Letters Patent.  Patented May 23, 1916.

Application filed December 4, 1915. Serial No. 65,092.

*To all whom it may concern:*

Be it known that I, CARL H. ROBINSON, a citizen of the United States, residing at Snow Hill, in the county of Wilcox and State of Alabama, have invented a new and useful Boll-Weevil-Removing Attachment for Cultivators, of which the following is a specification.

This invention relates to an attachment for cultivators whereby boll weevils can be knocked from plants and the cultivator to which the attachment is applied can at the same time turn the soil over onto the insects, thus to destroy them before they can reach other plants in the rows.

One of the principal objects of the invention is to provide an attachment which can be readily adjustable both laterally and vertically to plants of different sizes.

A further object is to provide an attachment of this character which is simple in construction and can be applied readily to the ordinary cultivator beam.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a perspective view of a cultivator having a single attachment applied thereto. Fig. 2 is a plan view showing a series of attachments positioned on the beam of a cultivator.

Referring to the figures by characters of reference 1 designates a cultivator beam to which is connected a standard 2 and a soil engaging element 3. These parts are of the usual or any preferred structure.

The attachment constituting the present invention includes a box 4 adapted to be bolted or otherwise secured to the beam 1 as indicated at 5. Adjustably mounted in the box is a stem 6. This stem can be adjusted longitudinally or can be rotated about its longitudinal axis so as to bring it to any desired position after which it can be held by means of a set screw 7 carried by the box 4 or in any other suitable manner. Extending through one end portion of the stem 6 is an opening 8 in which is arranged a rod 9 adjustable longitudinally within the opening. A set screw 10 is carried by the stem 6 and serves to bind upon the rod 9 and hold it against movement relative to the stem. Secured to the rod 9 is a chain 11 or other suitable flexible element which is preferably slack as shown, and which constitutes the principal plant agitating means of the attachment.

In using the attachment, the box 4 is fastened to one side of the beam 1 after which the stem 6 is inserted into the box. The stem can be arranged with the rod 9 either above or below the box. In the drawings the rod has been shown below the box. By means of the set screw 7 the stem 6 can be secured at any desired elevation and with the rod 9 extended at any desired angle relative to the sides of the beam 1. Rod 9 can be adjusted longitudinally relative to the stem 6 so as to extend any desired distance beyond the side of the beam 1 after which it can be held by means of set screw 10. By providing an attachment such as described, the same can be readily adjusted for use in connection with plants of different heights and of different distances apart. When the cultivator is drawn between the rows, the slack agitating device 11 will strike the plants and cause the boll weevils to be dislodged. They will fall to the ground and the soil engaging element 3 following immediately after the removing attachment, will overturn the soil so that the insects will be covered and thus destroyed.

Obviously instead of applying a single attachment to the beam, a series of them may be connected thereto as shown in Fig. 2.

What is claimed is:—

1. A boll weevil removing attachment for cultivators and the like, including an attaching member, a stem adjustably mounted therein, a member carried by the stem and adjustable horizontally relative thereto, and a slack element connected at its ends to the ends of said member.

2. An attachment for removing boll weevils, including an attaching member adapted to be secured to the beam of a cultivator or the like, a stem adjustable vertically in said member and mounted for rotation therein, means for holding the stem against movement relative to said member, a member carried by the stem and adjustable horizontally relative thereto, means for holding said member against movement relative to the stem, and a slack agitating device carried by said radially adjustable member.

3. An attachment for removing boll weevils, including an attaching member adapted to be secured to the beam of a cultivator or the like, a stem adjustable vertically within said member and mounted for rotation, means engaging the stem for holding it against movement relative to the attaching member, a rod extending through the stem and adjustable horizontally relative thereto, means for holding the rod against movement relative to the stem, and a normally slack flexible element secured at its ends to the ends of said rod.

4. The combination with a beam and a soil engaging element carried by the beam, of a box secured to one side of the beam, a stem connected to the box and adjustable vertically, said stem being mounted for adjustment about its longitudinal axis, means for holding the stem against movement relative to the box, a member extending radially from the stem, and a normally slack flexible element extended from said member and secured at its ends thereto.

5. The combination with a beam and a soil engaging element carried by the beam, of a box secured to one side of the beam, a stem connected to the box and adjustable vertically, said stem being mounted for adjustment about its longitudinal axis, means for holding the stem against movement relative to the box, a member extending radially from the stem, and a normally slack flexible element extended from said member and secured at its ends thereto, said member being adjustable longitudinally relative to the stem, and means for holding said member against movement relative to the stem.

In testimony that I claim the foregoing as my own, I have hereto affixed my signature in the presence of two witnesses.

CARL H. ROBINSON.

Witnesses:
P. E. MATHESON,
W. G. SIMPSON.

Copies of this patent may be obtained for five cents each, by addressing the "Commissioner of Patents, Washington, D. C."